Patented June 20, 1933

1,914,638

UNITED STATES PATENT OFFICE

KARL M. HERSTEIN, OF NEW YORK, N. Y., ASSIGNOR TO ZENOBIA COMPANY, INC., A CORPORATION OF NEW YORK

NUT PRODUCT AND PROCESS FOR PREPARING SAME

No Drawing.   Application filed May 7, 1929.   Serial No. 361,257.

My present invention is concerned with a nut product and the process for preparing the same and has its preferred application to pistachio nuts.

It is an object of the invention to provide a nut product of the above character of enhanced immunity to wormy or bacterial infestation, and which will maintain its crisp palatable condition even in humid weather conditions.

Another object is to provide a nut product of the above character which can be readily prepared without the need for elaborate apparatus or a high order of skill, the preservative agency of which involves no harmful ingredients, is dry to the touch in the finished product and improves the attractiveness of the nut to the eye and will not come off upon the fingers or clothing of the consumer.

By the present invention I seek to improve upon the invention of the prior reissue Patent No. 15,902 of Salim F. Zaloom, the general teachings of which I have followed.

According to the present invention, the nut, the hard shell of which is first slightly opened, is seasoned by applying the salt brine within the roaster, as in the prior application, Serial No. 344,278 of Leon K. Norian. The preservative salt coating, which is finally applied to the hard shell of the nut, includes, according to the present invention, an ingredient differing from ordinary sodium chloride or table salt in that it ordinarily crystallizes with one or more molecules of water of crystallization which it loses under the moderate heat of the roaster.

A nut including such ingredient in the coating upon its shell will accordingly, in addition to its ordinary hygroscopy or physical avidity for moisture evince a pseudo-chemical avidity, to satisfy its unsaturated bonds for water of crystallization, which is incorporated into the coating without the coating losing its apparent dryness and becoming moist to the touch. In humid weather accordingly, this ingredient on the shell will take up substantial quantities of moisture from the atmosphere and thereby prevent such moisture from entering into the kernel and making the latter soggy. Under drier atmospheric conditions this salt will again give off part or all of its water of crystallization and thus be regenerated in the protective avidity above described, for water.

A preferred salt for the purpose in hand is dibasic sodium phosphate ($Na_2HPO_4 \cdot 12H_2O$). This salt loses water of crystallization under moderate temperature and it is not unpleasant to the taste and not injurious. Preferably the sodium phosphate is mixed in a proportion of one part sodium phosphate ($Na_2HPO_4 \cdot 12H_2O$) to approximately nine parts of common table salt (sodium chloride), which is applied to the nut in the roaster after a foundation of a mucilaginous substance preferably starch solution has been first formed upon the nut shell. While the latter is still sticky with its foundation coating, the composite salt solution is applied and built upon the muscilaginous base.

By this process the salt exposed upon the exterior surface of the nut is closely concentrated, in fact it completely covers the surface of the starch coat thereunder. The effectiveness of the salt coating is thus greater than were it homogeneously admixed throughout the thickness or throughout part of the thickness of a mucilaginous coating.

Sodium sulphate ($Na_2SO_4 \cdot 7H_2O$) or other salts capable of forming semi-stable crystalline hydrates under normal atmospheric conditions could be substituted for the dibasic sodium phosphate mentioned above but I prefer the specific ingredients set forth.

It will thus be seen that there is herein described a product and a process in which the several features of this invention are embodied, and which in use attain the various objects of the invention and are well suited to meet the requirements of practical use.

As many changes could be made in the above product and process and many apparently widely different embodiments of this invention could be made without departing from the scope thereof, it is intended that all matter contained in the above description shall be interpreted as illustrative and not in a limiting sense.

Having thus described my invention, what

I claim as new and desire to secure by Letters Patent is as follows:

1. A nut product having a hard split shell with a dried mucilaginous substance thereon and an outer salt coating adhesively retained thereon, said coating including a proportion of an edible salt having unsaturated bonds for water of crystallization.

2. A nut product having a seasoned kernel and a shell having an outer salt coating including a sodium phosphate and an adherent layer of a mucilaginous substance securing the salt coating to the outer surface of the nut shell.

3. The process of preparing a nut product which includes the step of roasting the nuts and then treating them under heat in the roaster, said treatment including seasoning the kernel, then applying upon the shell an adherent layer including a mucilaginous substance, and following with the addition of a solution containing salt and edible crystalline material capable of forming crystals with various degrees of hydration under atmospheric conditions.

Signed at New York in the county of New York and State of New York this 6th day of May A. D. 1929.

KARL M. HERSTEIN.